United States Patent
Motamedi et al.

(10) Patent No.: US 11,429,631 B2
(45) Date of Patent: Aug. 30, 2022

(54) MEMORY-EFFICIENT PROGRAMMATIC TRANSFORMATION OF STRUCTURED DATA

(71) Applicant: ServiceNow, Inc., Santa Clara, CA (US)

(72) Inventors: Khosrow Jian Motamedi, San Diego, CA (US); Fernando Ros, San Marcos, CA (US); Douglas Andrew Bell, South Dudley (AU)

(73) Assignee: ServiceNow, Inc., Santa Clara, CA (US)

( * ) Notice: Subject to any disclaimer, the term of this patent is extended or adjusted under 35 U.S.C. 154(b) by 267 days.

(21) Appl. No.: 16/675,913

(22) Filed: Nov. 6, 2019

(65) Prior Publication Data

US 2021/0133204 A1 May 6, 2021

(51) Int. Cl.
*G06F 16/25* (2019.01)
*G06F 16/22* (2019.01)
*G06F 16/28* (2019.01)
*G06F 16/2455* (2019.01)
*H04L 9/00* (2022.01)

(52) U.S. Cl.
CPC .......... *G06F 16/258* (2019.01); *G06F 16/221* (2019.01); *G06F 16/2282* (2019.01); *G06F 16/24564* (2019.01); *G06F 16/282* (2019.01); *H04L 9/006* (2013.01)

(58) Field of Classification Search
CPC ....... G06F 16/258; G06F 16/86; G06F 16/282
See application file for complete search history.

(56) References Cited

U.S. PATENT DOCUMENTS 6,609,122 B1 8/2003 Ensor
6,678,887 B1 1/2004 Hallman
(Continued)

FOREIGN PATENT DOCUMENTS

CN 104765775 A 7/2015

OTHER PUBLICATIONS

Oracle Java Documentation, "The Java™ Tutorials," Oracle's Streaming XML parser Implementation (The Java™ Tutorials > Java API for XML Processing (JAXP) > Streaming API for XML), printed from the World Wide Web Sep. 7, 2018.
(Continued)

*Primary Examiner* — Grace Park
(74) *Attorney, Agent, or Firm* — Fletcher Yoder PC

(57) ABSTRACT

A system includes a processor configured to obtain a sequence of transformer rules. The transformer rules specify a set of data elements arranged according to a first structured data format, and structural changes to be performed on the data elements that convert the data elements into a second structured data format. The processor receives a block of data from a file arranged according to the first structured data format. The processor executes the sequence of transformer rules to perform the structural changes to the block of data. When executing the particular transformer rule, the processor applies an adapter associated with the transformer rule to modify values in the block of data specified by the particular transformer. The processor then provides for display or storage the block of data as converted into the second structured data format by the sequence of transformer rules.

20 Claims, 23 Drawing Sheets

(56) References Cited

U.S. PATENT DOCUMENTS

| | | |
|---|---|---|
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,483,901 B1 | 1/2009 | Massoudi et al. |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,945,860 B2 | 5/2011 | Vampenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,211 B2 | 10/2017 | Kelkar |
| 2001/0047372 A1* | 11/2001 | Gorelik .................. G06F 16/288 715/239 |
| 2004/0044729 A1* | 3/2004 | Foerg .................. H04L 67/2823 709/246 |
| 2004/0163041 A1* | 8/2004 | Engel ...................... G06F 16/86 715/234 |
| 2013/0007216 A1 | 1/2013 | Fries et al. |
| 2014/0297670 A1* | 10/2014 | Arshad .................. G06F 16/88 707/756 |
| 2016/0117293 A1* | 4/2016 | Dettman ............... G06F 16/258 715/234 |
| 2019/0089801 A1* | 3/2019 | Aravamudan ........ G06F 16/258 |

OTHER PUBLICATIONS

JSON—Global, "JSON—Global / ServiceNow Docs", http://docs.servicenow.com/bundle/newyork-application-development/page/app-store/dev_portal/API_reference/JSON/concept/c_JSONAPI.html, printed from the World Wide Web Sep. 18, 2019.

International Search Report & Written Opinion for PCT Application No. PCT/US2020/059223 dated Feb. 4, 2021 10 pgs.

* cited by examiner

|  | JSON | XML | Java Object | Database Records |
|---|---|---|---|---|
| JSON | X | X | X | X |
| XML | X | X | X | X |
| Java Object | X | X | X | X |
| Database Records | X | X | X | X |

FIG. 6B

| First Name | Last Name | Age | Car Make | Car Color |
|---|---|---|---|---|
| John | Doe | 30 | Pontiac | Red |
| Jane | Dee | 40 | Honda | Blue |
| ⋮ | ⋮ | ⋮ | ⋮ | ⋮ |

FIG. 10

DOCUMENT
1100

```
employees : [
  {
    "firstName" : "John",
    "lastName" : "Doe",
    "age" : 30,
    "cars" : [
        {"Make" : "Pontiac", "Color" : "Red"},
        {"Make" : "Ford", "Color" : "Black"}
    ]
  },
  {
    "firstName" : "Jane",
    "lastName" : "Dee",
    "age" : 40,
    "cars" : [
        {"Make" : "Honda", "Color" : "Blue"}
    ]
  },
  {
   ...
  }
  ...
]
```

1105 — {firstName...cars array (John)}
1110 — {firstName...cars array (Jane)}
1115 → "cars" : [
1117 → {"Make" : "Pontiac", "Color" : "Red"}

| First Name | Last Name | Age | Cars |
|---|---|---|---|
| John | Doe | 30 | Cars.Row1<br>Cars.Row2 |
| Jane | Dee | 40 | Cars.Row3 |
| ⋮ | ⋮ | ⋮ | ⋮ |

1310

| Make | Color |
|---|---|
| Pontiac | Red |
| Ford | Black |
| Honda | Blue |
| ⋮ | ⋮ |

OBJECTS

```
Objects : [
    { //Object 0
        String firstName="John";
        String lastName="Doe";
        Integer age=30;
        [String:String] car = ["Make" : "Pontiac", "Color" : "Red"]
    },
    { //Object 1
        String FirstName="Jane";
        String LastName="Dee";
        Integer Age=40;
        [String:String] car = {"Make" : "Honda", "Color" : "Blue"}
    },
    { //Object N
        . . .
    }
]
```

FIG.16A

OBJECT SCHEMA

| "lastName" : String |
| "firstName" : String |
| "age" : Integer |
| "car" : [String:String] |

FIG.16B

TRANSFORMER RULES

| "firstName" To: "employee.firstName |
| "lastName" To: "employee.lastName |
| "age" To: "employee.age" |
| "car" To: "employee.car" |

FIG.16C

DOCUMENT - 1705

```
employees : [
  employee {
    "firstName" : "John",
    "lastName" : "Doe",
    "Age" : 30
    "Car" : {"Make" : "Pontiac", "Color" : "Red"}
  },
  employee {
    "firstName" : "Jane",
    "lastName" : "Dee",
    "Age" : 30
    "Car" : {"Make" : "Honda", "Color" : "Blue"}
  },
  employee {
    . . .
  }
  . . .
]
```

FIG. 17

MEMORY-EFFICIENT PROGRAMMATIC TRANSFORMATION OF STRUCTURED DATA

BACKGROUND

Over the last several decades, the memory size of many computing devices, such as personal computers and servers, has grown along with the capacity of networks that these devices use for communication. The representation of information in data-interchange files has accordingly evolved from memory-efficient and capacity-efficient binary encodings to less efficient text-based human-readable forms such as the Extensible Markup Language (XML), JavaScript Object Notation (JSON), or other types of structured data formats. These human-readable formats are commonly used for communication between a web browser and a web server, for example, and have the advantages of being simple to create, parse, and debug.

Many applications cannot operate directly on data presented within text-based human-readable forms and may, therefore, rely on methods to convert the text-based human-readable form to a form suitable for processing by the application. For example, a JAVA® application may convert a JSON file to a JAVA® object. Unfortunately, for large text-based human-readable forms, converting the forms in this manner can be expensive in terms of the time and processing power required to perform the conversion.

SUMMARY

To overcome the problems described above, various transformer embodiments are disclosed herein that are configured to convert select data from, for example, a JSON-formatted document to an array of JAVA® objects. For example, the select data may correspond to a particular array of records and/or elements stored within the document. The transformer embodiments may operate on a document stored within a memory of a system on which the transformer embodiment operates. In addition, or alternatively, the transformer embodiments may operate on blocks of data representing parts of the document. In this case, the amount of memory in use by the transformer may be on the order of the sum of the size of a single block, the most recent record being read, plus the object being constructed. For large documents, this translates to small fractions of the full document in terms of memory consumption. This in turn, reduces the time and processing power required to perform the conversion.

Accordingly, a first example embodiment may involve a system that includes a processor and a memory. The memory is in communication with the processor and stores instruction code that is executable by the processor. The instruction code causes the processor to obtain a sequence of transformer rules. The transformer rules specify (i) a set of data elements arranged according to a first structured data format, (ii) structural changes to be performed on the set of data elements that convert the set of data elements into a second structured data format. A particular transformer rule further specifies an adapter that modifies values from the set of data elements specified by the particular transformer rule. The processor further receives a block of data from a file and/or memory arranged according to the first structured data format. The processor then executes the sequence of transformer rules to perform the structural changes to the block of data. When executing the particular transformer rule, the processor applies the adapter to modify values in the block of data specified by the particular transformer. The processor then provides for display or storage the block of data as converted into the second structured data format by the sequence of transformer rules.

In a second example embodiment, an article of manufacture may include a non-transitory computer-readable medium, having stored thereon program instructions that, upon execution by a computing system, cause the computing system to perform operations in accordance with the first example embodiment.

In a third example embodiment corresponds to a method for carrying out each of the operations of the first example embodiment.

In a fourth example embodiment, a system may include various means for carrying out each of the operations of the first example embodiment.

A fifth example embodiment may involve a system that includes a processor and a memory. The memory is in communication with the processor and stores instruction code that is executable by the processor. The instruction code causes the processor to create a rule repository instance. The rule repository instance specifies a plurality of different procedures that facilitate specifying a sequence of transformer rules. Each of the procedures returns a reference to the rule repository instance that facilitates specifying the sequence of transformer rules by cascading each of the procedures together using a dot notation format. Next, the processor configures the rule repository instance with a plurality of transformer rules specified by a set of procedures that are cascaded together using the dot notation format. Each of the transformer rules specifies (i) a set of data elements that are arranged according to a first structured data format, and (ii) structural changes to be performed on the set of data elements that convert the set of data elements into a second structured data format. The processor then associates a transformer class instance with (i) the rule repository instance and (ii) a file arranged according to the first structured data format. The processor controls, via a first procedures of the transformer class instance, the transformer class instance to perform the structural changes to the file according to the transformer rules of the rule repository instance. The transformer then provides, from the transformer class instance, data as converted into the second structured data format by the sequence of transformer rules.

In a sixth example embodiment, an article of manufacture may include a non-transitory computer-readable medium, having stored thereon program instructions that, upon execution by a computing system, cause the computing system to perform operations in accordance with the fifth example embodiment.

In a seventh example embodiment corresponds to a method for carrying out each of the operations of the fifth example embodiment.

In an eight example embodiment, a system may include various means for carrying out each of the operations of the fifth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B is a chart that illustrates various data conversions that may be performed by the first logic, in accordance with example embodiments.

FIG. 10 illustrates a table that may be generated from output of the transformer of FIG. 9, in accordance with example embodiments.

FIG. 11 illustrates a document that includes records having elements corresponding to arrays of objects, in accordance with example embodiments.

FIG. 13 illustrates tables that may be generated from data output from the transformer when converting records of a document having elements corresponding to arrays of objects, in accordance with example embodiments.

FIG. 16A represents an exemplary array of JAVA® objects that may be stored in the non-volatile memory, in accordance with example embodiments.

FIG. 16B illustrates an object schema associated with the array of JAVA® objects of FIG. 16A, in accordance with example embodiments.

FIG. 16C illustrates transformer rules associated with the array of JAVA® objects of FIG. 16A, in accordance with example embodiments.

FIG. 17 illustrates a JSON document that may be generated by the second logic, in accordance with example embodiments.

DETAILED DESCRIPTION

Figure 1:
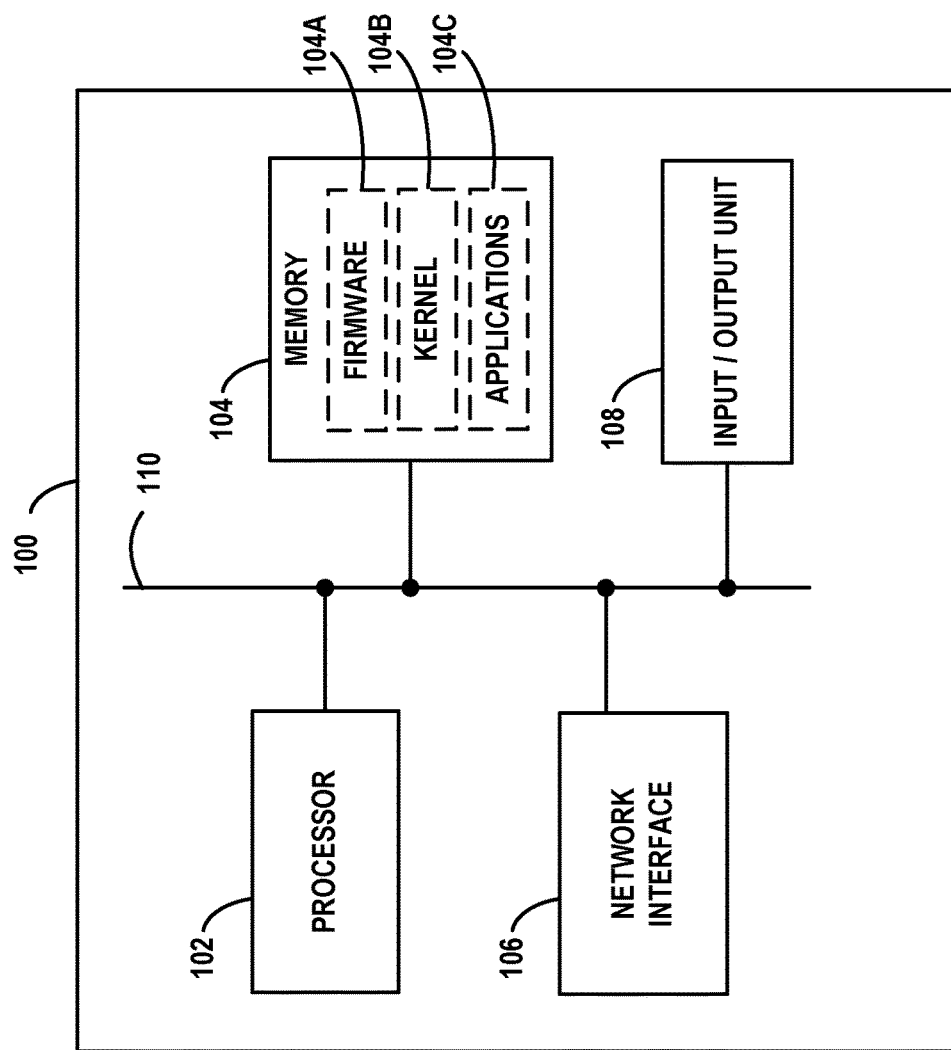
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
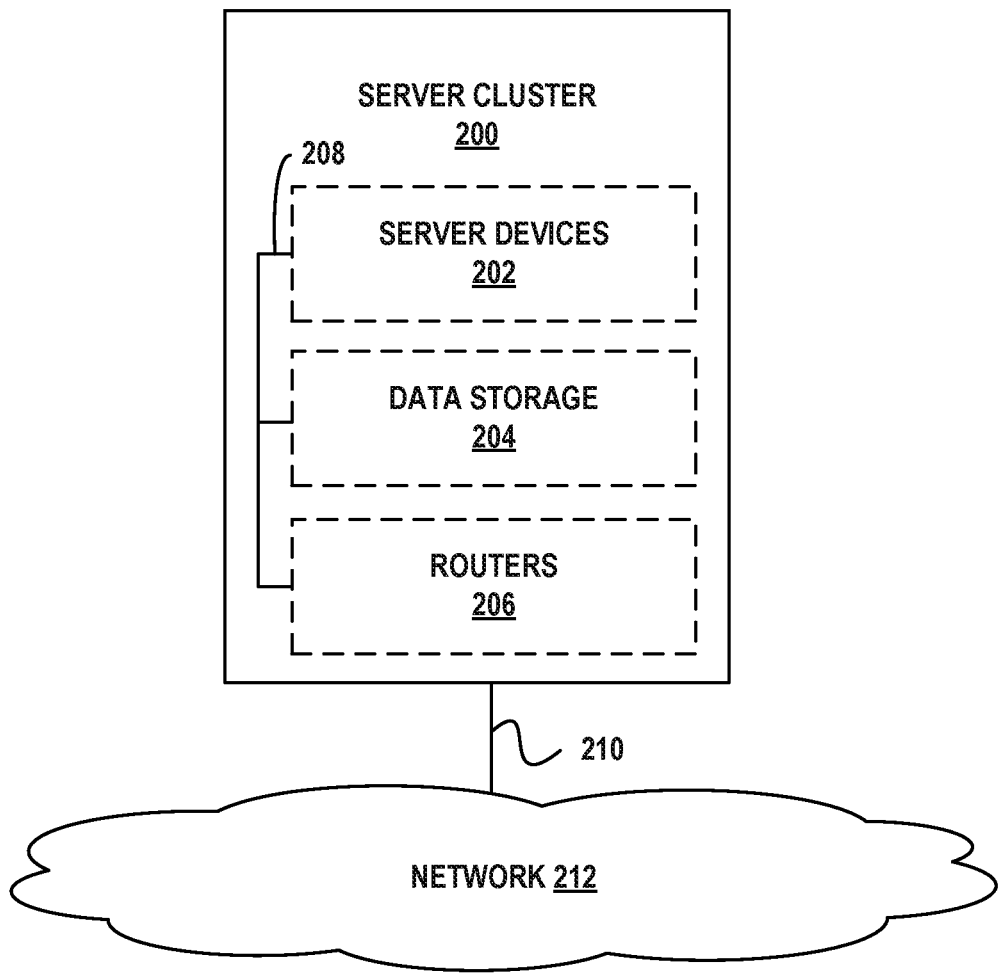
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
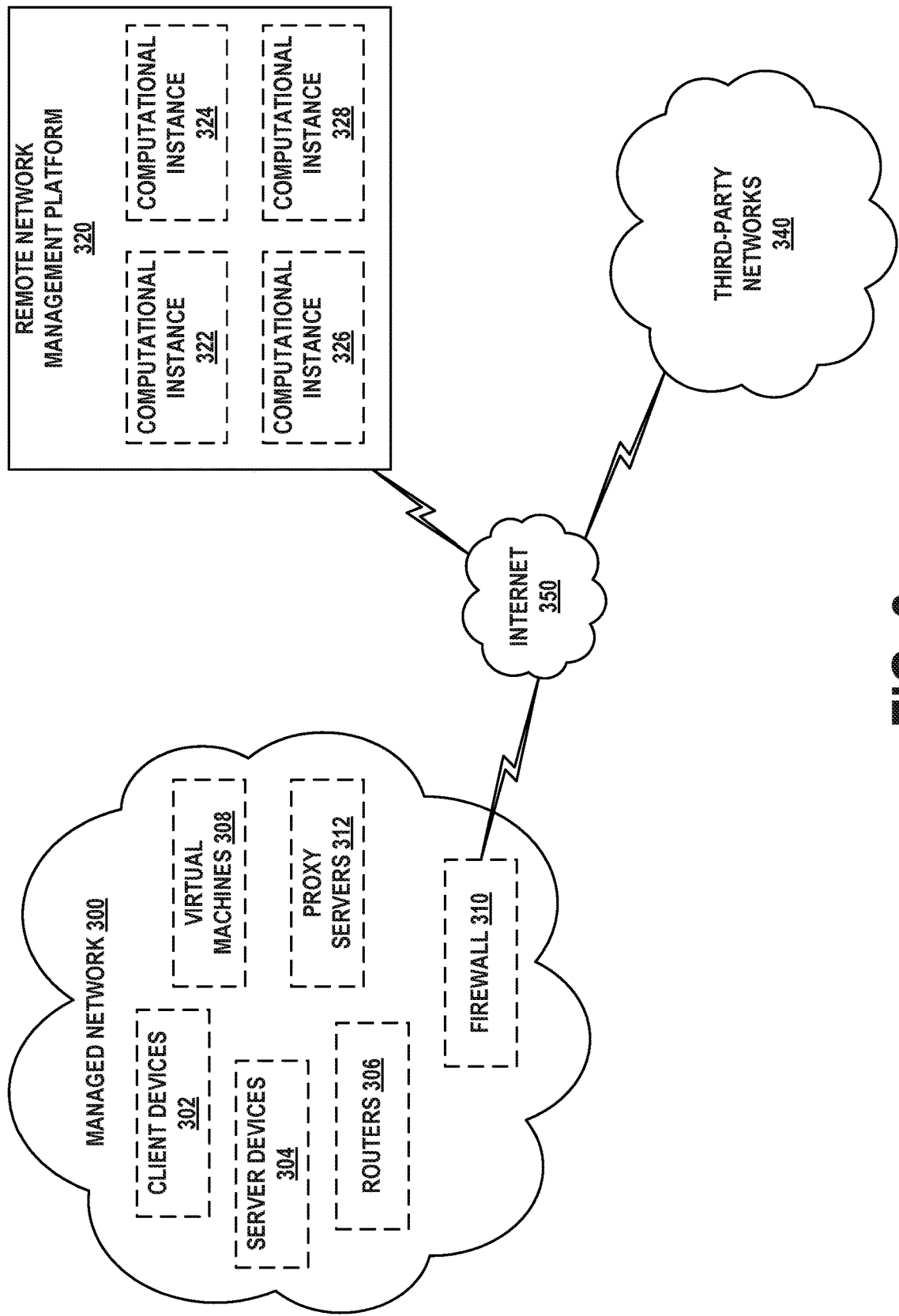
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
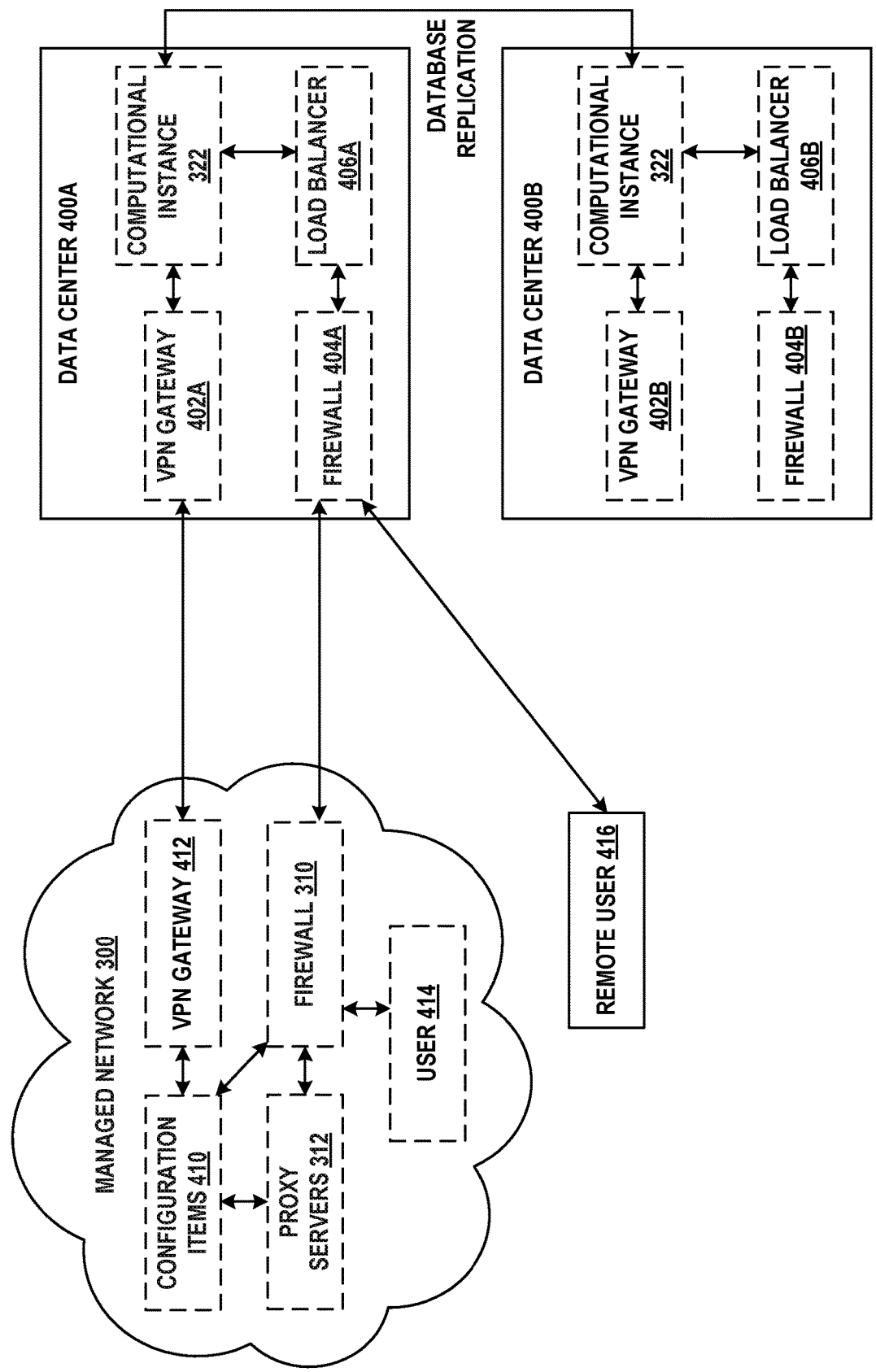
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
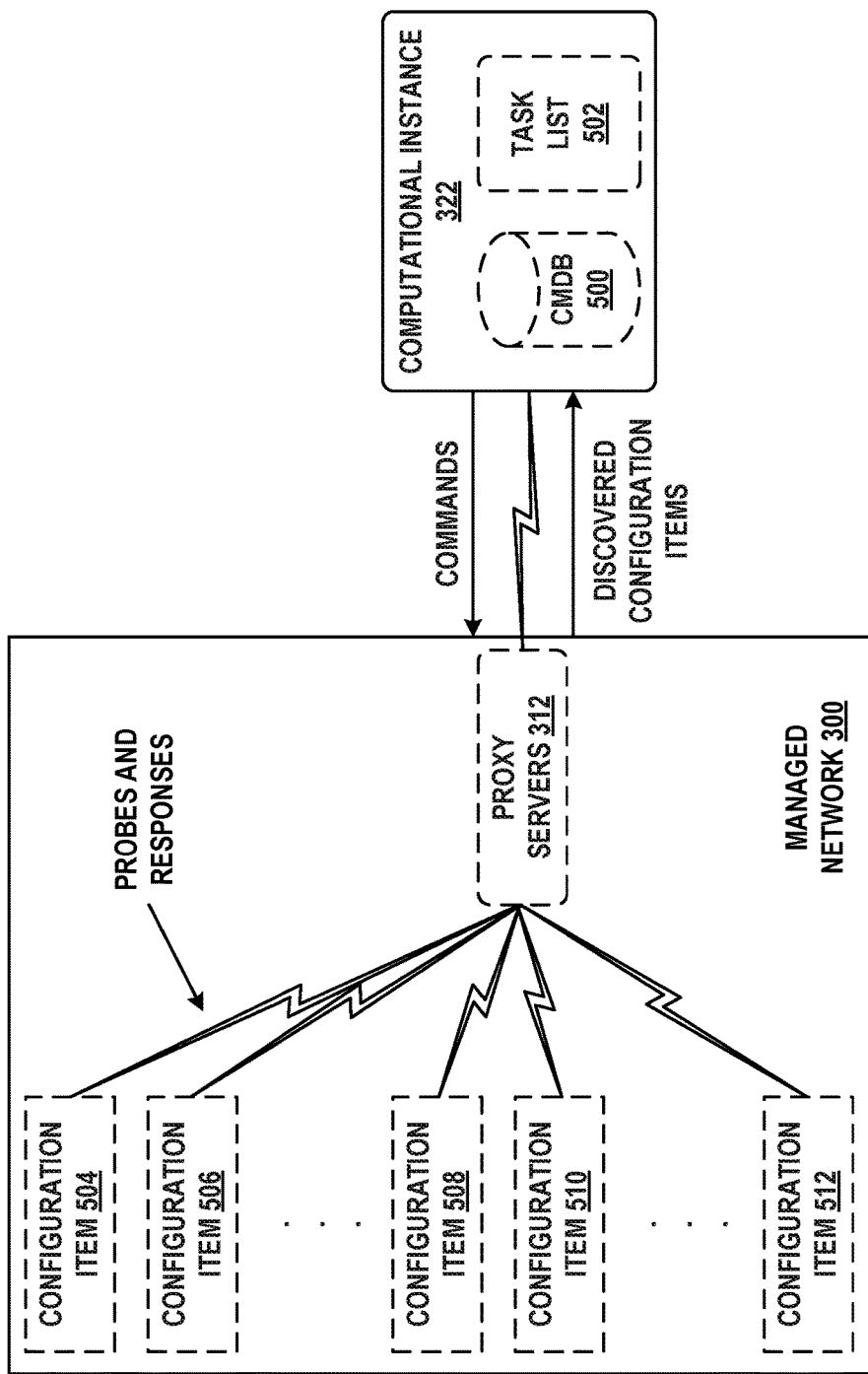
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
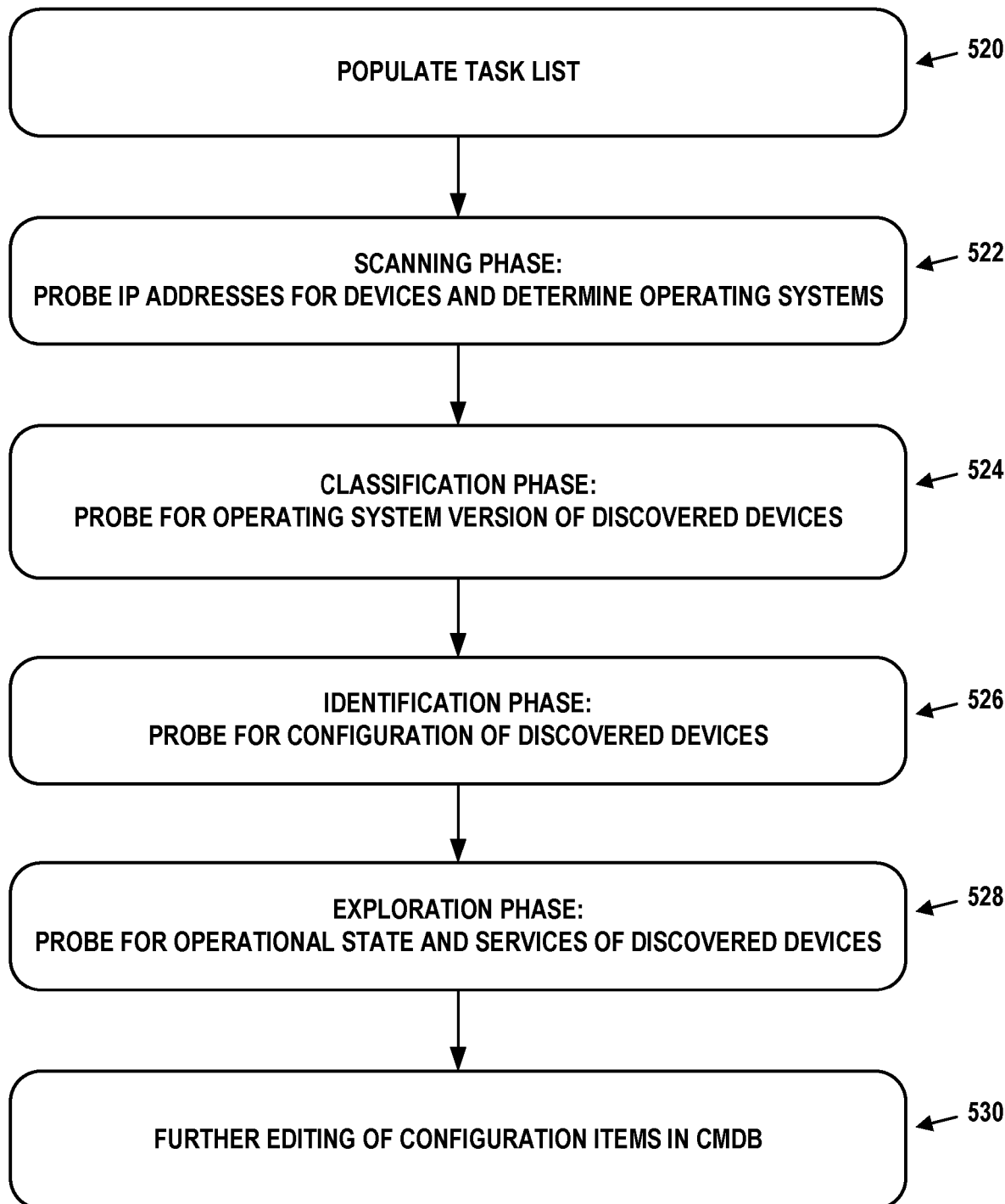
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. FIRST TRANSFORMATION LOGIC EMBODIMENT

Figure 6A:
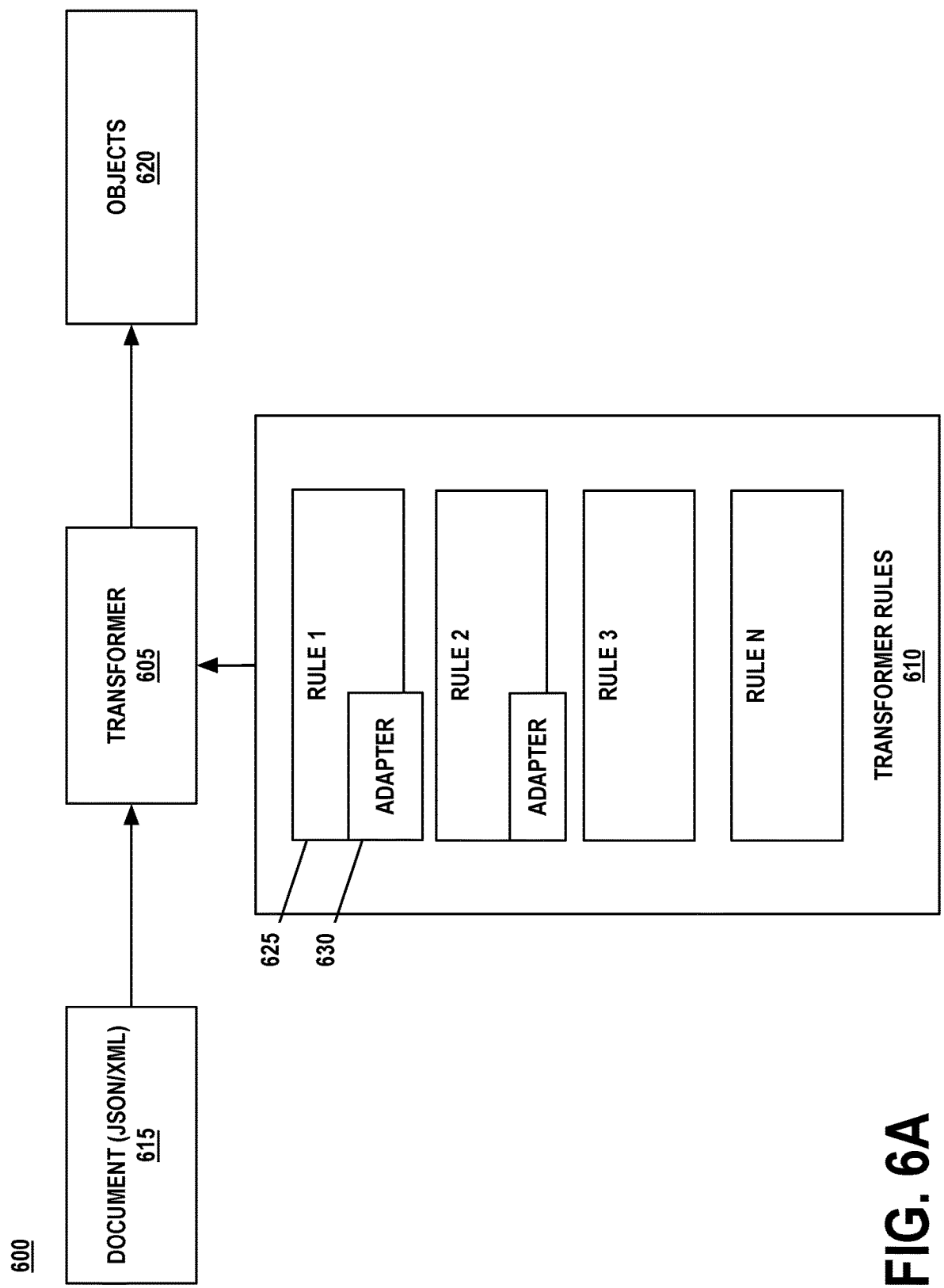
FIG. 6A depicts first logic that facilitates the conversion of data from a first structured data format to a second structured data format, in accordance with example embodiments.

FIG. 6A is an example of a first embodiment of logic 600 implemented by the processor 102 of the remote network management platform 320 that facilitates the conversion of select data, represented in a first structured data format, to a second structured data format. The logic 600 includes a transformer 605 that is configured to convert select data from a document 615 to an array of objects 620 according to a sequence of transformer rules 610. For example, logic 600 may retrieve specific records of a JSON-formatted document and convert these records to an array of JAVA® objects. In this regard, each object of a particular array of objects may define a non-hierarchical (i.e., flat) group of elements specified as key/value pairs. In addition, or alternatively, each object may define a hierarchy. That is each object may include elements that correspond to other objects and/or arrays of other objects.

These data to be converted in document 615 may be formatted in a defined syntax such as, for example, JSON or XML. The document 615 may correspond to a file stored in a non-volatile or a volatile memory of the remote network management platform 320. Alternatively, the document 615 may be stored in a system external to the remote network management platform 320 in which case data in the document 615 may be streamed to the remote network management platform 320. For example, the remote network management platform 320 may receive a sequence of data blocks that collectively correspond to the document and operate on these blocks.

To that point, the transformer 605 may perform conversion operations on a block-by-block basis. That is, the transformer 605 may begin conversion operations as the blocks of data are received. In this case, the amount of memory in use by the transformer may be on the order of the sum of the size of a single block, the most recent record being read, plus the object being constructed. For large documents, this translates to small fractions of the full document in terms of memory consumption. This, in turn, reduces the memory required to perform the conversion.

The transformer rules 610 may control the transformer 605 to convert data from the document 615 in a variety of manners, as illustrated by the graph of FIG. 6B. For example, as illustrated by the respective X labelling in various column/row pairs, data in JSON documents, XML documents, JAVA® objects, or database records may be converted to JSON documents, XML documents, JAVA® objects, and/or database records. As illustrated, self-conversions may be possible (e.g., from one JSON format to another JSON format). It should be noted that the various syntax types illustrated in FIG. 6B are merely examples. It is understood that transformer rules may be provided to convert data structures having different defined syntaxes.

As used herein, the term object may refer to a data structure or other type of structural arrangement that contains one or more types of data in distinct elements. For example, an object may contain a string and an integer representing the name and age of a person, respectively. An object may also contain, as elements, one or more other objects or arrays of objects.

Regardless, the transformer rules 610 may control the transformer 605 to convert JSON or XML formatted records stored from the document 615 to a table of records suitable for entry in, for example, a database. The transformer rules 610 may facilitate the selection of records in the document 615 and the selection of specific elements within those records. The transformer rules 610 further facilitate associating the selected records and elements with different fields (e.g., columns) of, for example, a database table.

In some implementations, the transformer rules 610 may include adapters that facilitate converting values associated with the elements into different values. For example, adapters may be specified within a transformer rule to perform mathematical computations, concatenate different values of the document 615, select portions of the value associated with an element for output, etc.

There may be any number of transformer rules 610. Further, the transformer 605 may process the transformer rules 610 sequentially, in the order that the rules are specified to the transformer 605. As described below, the results of a first specified transformer rule may be utilized in a subsequently specified transformer rule—in other words, the output of one transformer rule may be the input to a subsequent transformer rule in the ordering. In this manner, transformer rules may be combined to control the transformer 605 to perform elaborate transformations of data.

Figure 7:
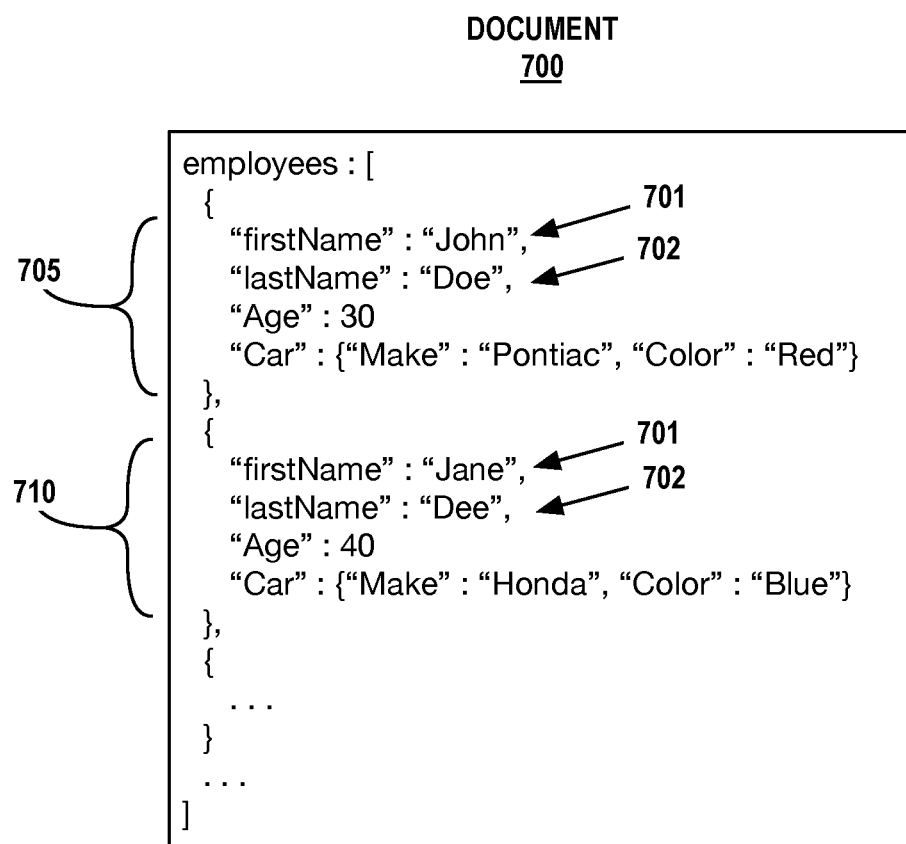
FIG. 7 illustrates a portion of a JSON-formatted document that includes data for conversion, in accordance with example embodiments.

FIG. 7 illustrates a portion of an exemplary JSON-formatted document 700 that includes data for conversion. The JSON-formatted document 700 may correspond to the document 615 of FIG. 6A. As shown, the JSON-formatted document 700 may define various elements (701 and 702), which belong to records (705 and 710). For example, the first record 705 may include information associated with a first employee, such as the employee's name, age, etc. The second record 710 may include similar information associated with a second employee.

Figure 8:
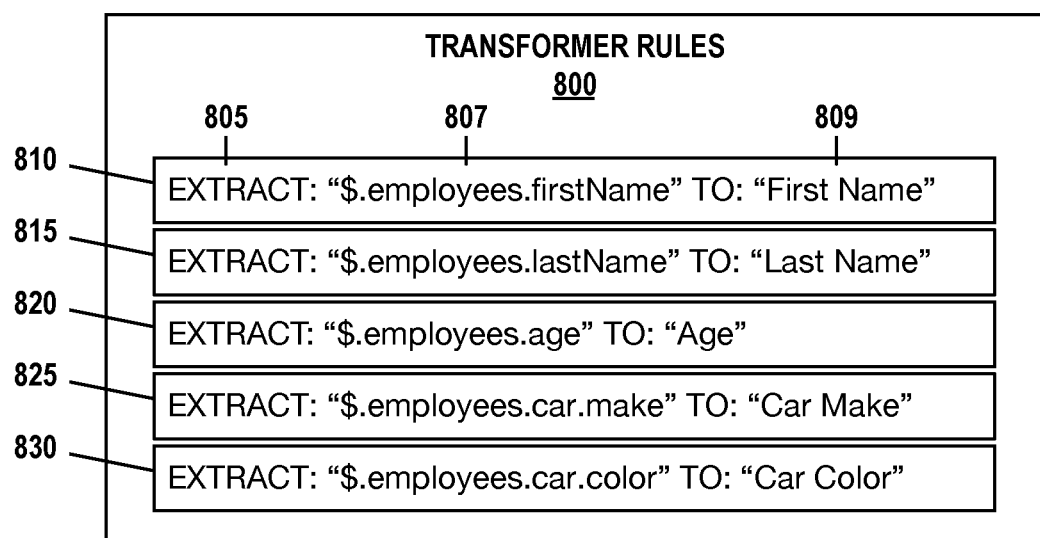
FIG. 8 illustrates transformer rules, in accordance with example embodiments.

FIG. 8 illustrates first exemplary transformer rules 800 for converting data of the exemplary JSON-formatted document 700. As shown, each transformer rule may specify a command 805 to be performed by the transformer 605 and one or more parameters that facilitate performing the command. For example, a first transformer rule 810 may specify the command 805 EXTRACT, the path expression 807 "$.employees.firstName" and the field 809 "First Name." The EXTRACT command may control the transformer 605 to obtain one or more values from the JSON-formatted document 700 that are specified by the path expression 807 and to associate the obtained values with the field 809. The field 809 may correspond to the name of a key of a key/value pair created by the transformer 605 to associate the field 809 with the obtained values.

The path expression 807 may specify an element within a record of the JSON-formatted document 700. For example, the path expression "$.employees.firstName" specifies the element 701 "firstName" of the first record 705 and the second record 710 of the JSON-formatted document 700. In the example, the path expression 807 corresponds to a JSON path expression because the JSON-formatted document 700 is a JSON-formatted document. However, an XPATH expression may be specified when the document 615 corresponds to an XML formatted document.

Following the example above, the second transformer rule 815 may control the transformer 605 to obtain and associate one or more values from the JSON-formatted document 700 that are specified by the path expression 807 "$.employees.lastName" with the field 809 "Last Name." The third transformer rule 820 may control the transformer 605 to obtain and associate one or more values from the JSON-formatted document 700 that are specified by the path expression 807 "$.employees.age" with the field 809 "Age." The fourth transformer rule 825 may control the transformer 605 to obtain and associate one or more values from the JSON-formatted document 700 that are specified by the path expression 807 "$.employees.car.make" with the field 809 "Car Make." The fifth transformer rule 830 may control the transformer 605 to obtain and associate one or more values from the JSON-formatted document 700 that are specified by the path expression 807 "$.employees.car.color" with the field 809 "Car Color."

VI. EXAMPLE OPERATIONS OF FIRST TRANSFORMATION LOGIC EMBODIMENT

Figure 9A:
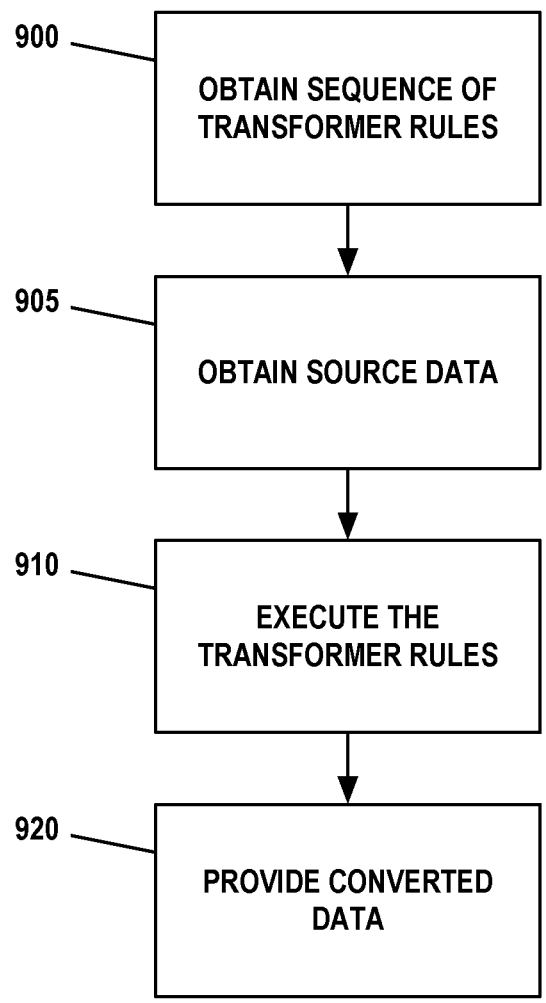
FIG. 9A is a flow chart illustrating operations performed by a transformer in converting data in accordance with the first embodiment, in accordance with example embodiments.
Figure 9B:
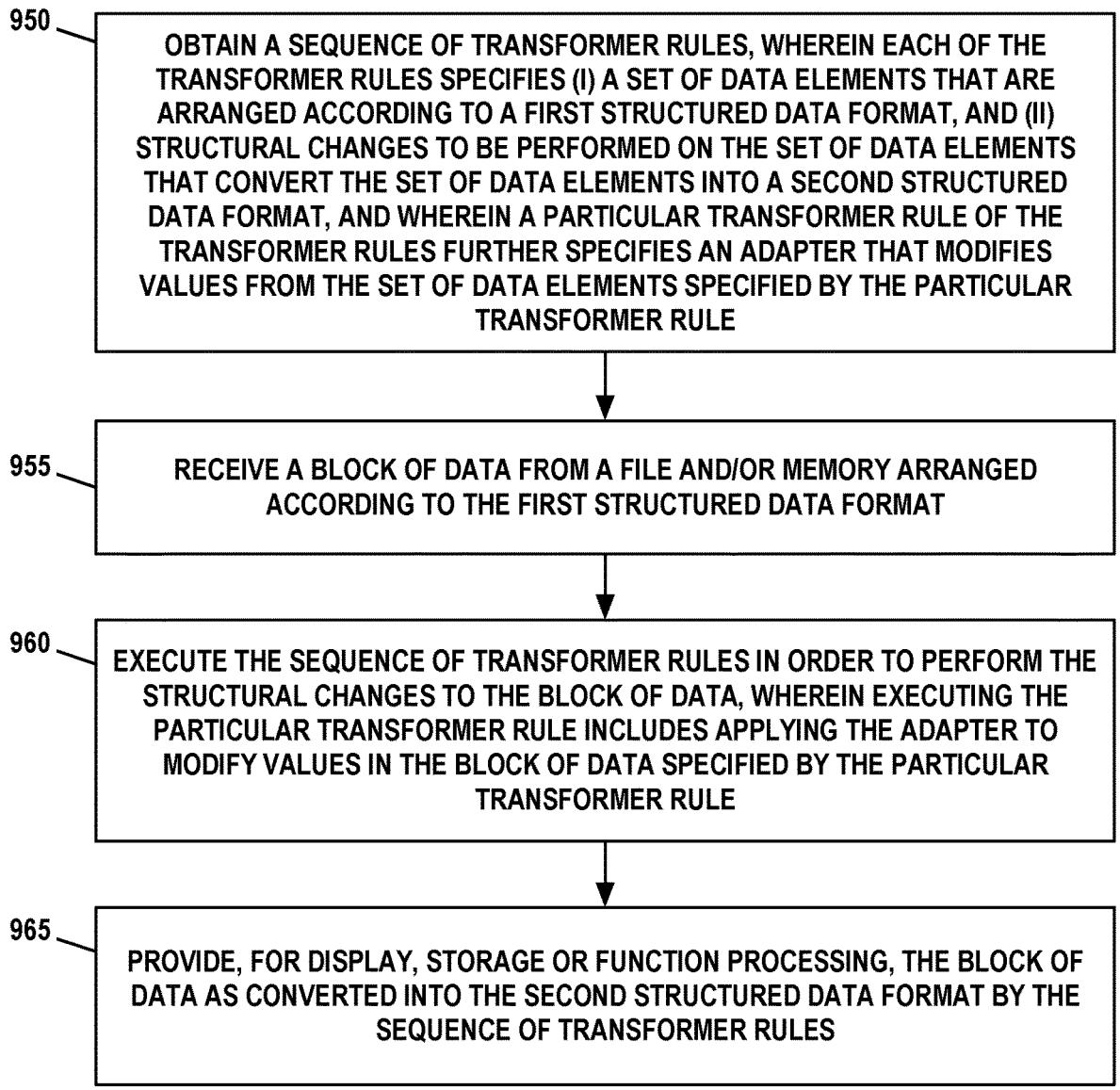
FIG. 9B is a flow chart illustrating a variation of the operations illustrated in FIG. 9A, in accordance with example embodiments.

FIGS. 9A and 9B are flow charts illustrating example operations performed by the transformer 605 in converting data in accordance with the first embodiment. The operations may be performed by a computing device, such as the computing device 100 illustrated in FIG. 1, and/or a cluster of computing devices, such as the server cluster 200 illustrated in FIG. 2. However, the operations may be performed by other types of devices or device subsystems. For example, the operations may be performed by a portable computer, such as a laptop or a tablet device.

The embodiment of FIGS. 9A and 9B may be simplified by the removal of any one or more of the features shown therein. Further, the embodiment may be combined with features, aspects, and/or implementations of any of the previous figures or otherwise described herein.

At operation 900 of FIG. 9A, the transformer 605 may obtain one or more transformer rules from the first exemplary transformer rules 800. For example, the transformer 605 may obtain the transformer rules illustrated in FIG. 8.

At operation 905, the transformer 605 may obtain source data. For example, the transformer 605 may obtain the JSON-formatted document 700 illustrated in FIG. 7. In this regard, the transformer 605 may retrieve the entire JSON-formatted document 700 from a non-volatile or volatile memory in communication with the transformer 605. Alternatively, the JSON-formatted document 700 may be stored in a system external from the transformer 605 in which case data in the JSON-formatted document 700 may be streamed. In this case, the transformer 605 may obtain blocks of data that collectively correspond to the JSON-formatted document 700.

At operation 910, the transformer 605 may apply the transformer rules against the source data and provide/output the converted data at operation 920. In this regard, the transformer rules may be applied on a record-by-record basis. That is, all the transformer rules may be applied against the first record 705 in the JSON document of FIG. 9 followed by the second record 710. For example, in the first iteration, the first transformer rule 810 may control the transformer 605 to obtain values from the first record 705 associated with the path expression 807 "$.employees.firstName" and to associate the obtained values with the field 809 "First Name." The second and third transformer rules (815 and 820) may control the transformer 605 to obtain values from the first record 705 associated with the path expressions 807 "$.employees.lastName" and "$.employees.age," respectively, and to associate the respective values with the fields 809 "Last Name" and "Age." The fourth and fifth transformer rules (825 and 830) may control the transformer 605 to obtain values from the first record 705 associated with the path expressions 807 "$.employees.car.make" and "$.employees.car.color," respectively, and to associate the respective values with the fields 809 "Car Make" and "Car Color." Upon completion of the first iteration, the transformer may output, for example, a dictionary of key/values pairs that associates each of the values above with a corresponding field. This process may repeat until all the transformer rules have been applied to the first record. Afterward, the transformer 605 may apply the transformer rules to the second record and so on.

In one implementation, the output of the transformer 605 may be utilized to generate records for a table of a database. For example, as shown in FIG. 10, a first record 1005 in the table 1000 may include values associated with the first record 705 of the JSON-formatted document 700 illustrated in FIG. 7. A second record 1010 in the table 1000 may include values associated with the second record 710 of the JSON-formatted document 700. The column names 1015 of the table 1000 may correspond to the fields 809 specified in the first exemplary transformer rules 800 illustrated in FIG. 8.

In the example, each record of the JSON-formatted document 700 includes elements that were representable using a dictionary of key/value pairs, where each value is a scalar value such as an integer or a string. However, in some cases, a record may include an element that corresponds to an object or an array of objects.

FIG. 11 illustrates an exemplary document 1100 that includes records having elements corresponding to arrays of objects. For example, a first record 1105 of the document 1100 may include an element 1115 named "Cars," which corresponds to an array of two objects 1117. Each object in the array includes two elements having scalar string values. A second record 1110 has a similar structure. In the second record, the element named "Cars" corresponds to an array with a single object.

Figure 12:
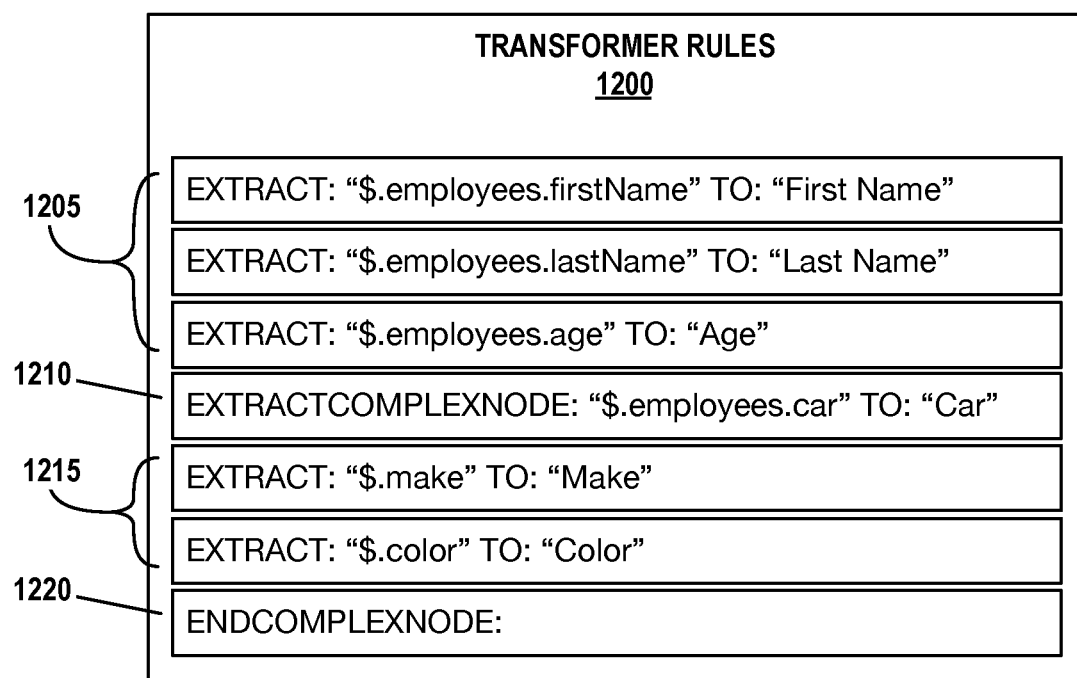
FIG. 12 illustrates transformer rules that facilitate converting records of a document having elements corresponding to arrays of objects, in accordance with example embodiments.

FIG. 12 illustrates second exemplary transformer rules 1200 that facilitate converting records of a document 1100 that specify a hierarchy of objects such as records that include elements that correspond to an array of objects. In this regard, the second exemplary transformer rules 1200 facilitate recursively associating key/values pairs at each level of the hierarchy to different tables that are associated with different levels of the hierarchy.

The first three transformer rules 1205 control the transformer 605 to obtain the elements named "firstName," "lastName," and "age" from a particular record, and to associate the obtained values with the fields "First Name," "Last Name," and "Age," respectively.

A fourth rule 1210 specifies the command EXTRACT-COMPLEXNODE along with the path "$employees.car" and field "Car." The fourth rule 1210 controls the transformer to associate the field "Car" with the array of objects specified by the path "$employees.car." The next two transformer rules 1215 are applied against the array of objects associated with the field "Car" and control the transformer to associate the values of the elements named "make" and "color" of each object of the "Car" array with the fields "Make" and "Color," respectfully. The last transformer rule 1220 notifies the transformer 605 that no further associations of elements of the "Car" array are required.

Referring to FIG. 13, upon applying the second exemplary transformer rules 1200 to the document 1100, the transformer 605 may output data that facilitates generating, for example, a first table 1300 that includes the values of the records in the document 1100 associated with fields "First Name," "Last Name," and "Age," and a "Cars" field that may include one or more links to rows of a second table 1310 that specifies the values associated with each element of each object of the "Cars" array. For example, the first record in the first table 1300 specifies links to the first and second rows 1315 in the second table 1310. The second record in the first table 1300 specifies links to the third row 1320 in the second table 1310.

FIG. 9B illustrates a more detailed variation of FIG. 9A. Block 950 may involve obtaining a sequence of transformer rules, wherein each of the transformer rules specifies (i) a set of data elements that are arranged according to a first structured data format, and (ii) structural changes to be performed on the set of data elements that convert the set of data elements into a second structured data format, and wherein a particular transformer rule of the transformer rules further specifies an adapter that modifies values from the set of data elements specified by the particular transformer rule.

Block 955 may involve receiving a block of data from a file arranged according to the first structured data format.

Block 960 may involve executing the sequence of transformer rules in order to perform the structural changes to the block of data, wherein executing the particular transformer rule includes applying the adapter to modify values in the block of data specified by the particular transformer rule.

Block 965 may involve providing, for display, storage or function processing, the block of data as converted into the second structured data format by the sequence of transformer rules.

In some embodiments, the first structured data format corresponds to one of: JSON, XML, a JAVA® object, or a database table, and wherein the second structured data format corresponds to one of: JSON, XML, a JAVA® object, or a database table.

In some embodiments, the set of data elements corresponds to one or more of: scalar values, records, objects, or arrays of objects.

In some embodiments, each of the transformer rules is associated with a JSON or XML path that specifies the set of data elements to be converted.

In some embodiments, the particular transformer rule specifies a field, wherein a second particular transformer rule specifies a change in format to be applied to a value associated with the field.

In some embodiments, the set of data elements includes a plurality of records, wherein each of the plurality of records specifies a key/value pair, wherein the method further involves associating each value of each record associated with a particular key to a column in a database table.

In some embodiments, the set of data elements includes a plurality of records, wherein each of the plurality of records includes a hierarchy of objects, wherein the method further involves recursively associating key/value pairs at each level of the hierarchy of objects to a database table associated with the level.

Some embodiments further involve generating, based on a type of the adapter, one or more new values from one or more values associated with the set of data elements.

In some embodiments, a new value of the one or more new values corresponds to one of: a result of a mathematical computation of the one or more values, outputting a textual portion associated with the one or more values that is specified by a pattern, a concatenation of the one or more values, or a lookup table value indexed according to one of the one or more values.

VII. ADAPTERS

Figure 14A:
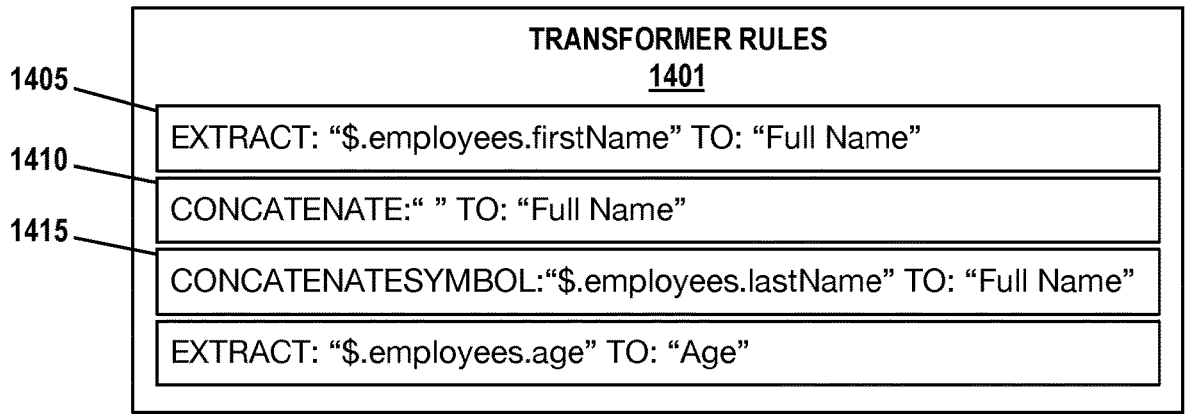
FIG. 14A illustrates transformer rules that implement an adapter that facilitates concatenating values associated with different elements of a record, in accordance with example embodiments.
Figure 14B:
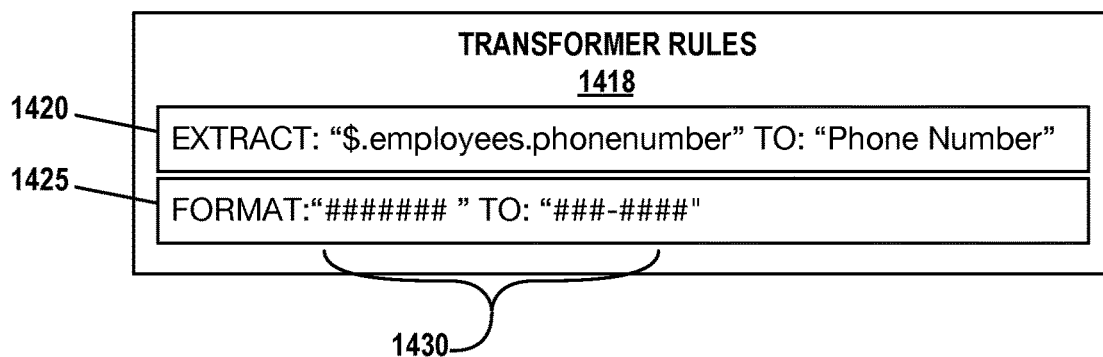
FIG. 14B illustrates transformer rules that implement an adapter that facilitates formatting values associated with different elements, in accordance with example embodiments.
Figure 14C:
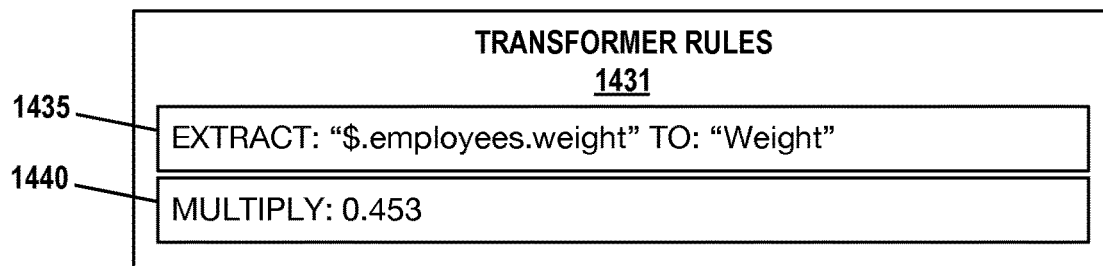
FIG. 14C illustrates transformer rules that implement an adapter that facilitate performing a calculation on values associated with different elements, in accordance with example embodiments.

As noted above, the transformer rules 610 illustrated in FIG. 6A may implement adapters 630 that facilitate converting values associated with the elements into different values. FIGS. 14A-14C illustrate additional transformer rules that include adapters.

FIG. 14A illustrates third exemplary transformer rules 1401 that implement an adapter that facilitates concatenating values associated with different elements of a record. For example, the first transformer rule 1405 controls the transformer to extract the values associated with the element specified by the path "$.employees.firstName" and to associate the value with the field "Full Name." After processing the first transformer rule, the string value "John" is associated with the field "Full Name." The second transformer rule 1410 implements an adapter that concatenates the current value associated with the field "Full Name" with a space character. After processing the second transformer rule 1410, the string value "John" is associated with the field "Full Name." The third transformer rule 1415 implements an adapter that concatenates the current value associated with the value for the element specified by the path "$.employees.lastName." Thus, after processing the third transformer rule 1415, the string value "John Doe" is associated with the field "Full Name." After processing all the transformer rules of the third exemplary transformer rules 1401 against the first record of, for example, the JSON-formatted document 700, the transformer may output data that includes the key/value pair "Full Name": "John Doe."

FIG. 14B illustrates fourth exemplary transformer rules 1418 that implement an adapter that facilitates formatting values associated with different elements. For example, if a record includes the element "phonenumber:1234567," the first transformer rule 1420 controls the transformer to extract and associate the value "1234567" with the field "Phone Number." The second transformer rule 1425 implements an adapter that controls the transformer to format the value associated with the previously received transformer rule according to a template 1430. After processing the second transformer rule 1425, the string value "123-4567" may be associated with the field "Phone Number."

FIG. 14C illustrates fifth exemplary transformer rules 1431 that implement an adapter that facilitates performing a calculation on values associated with different elements. For example, the weight of an employee may be specified in pounds by the element "weight:100," but desired to be specified in kilograms. In this case, the first transformer rule 1435 controls the transformer to extract and associate the value "100" with the field "Weight." The second transformer rule 1440 implements an adapter that controls the transformer to multiply the value associated with the previously received transformer rule by the value 0.453. After processing the second transformer rule 1440, the value 45.3, which corresponds to the employee's weight in kilograms, may be associated with the field "Weight."

Additional adapters may be implemented by the transformer rules for converting values. For example, an adapter that facilitates associating a textual portion of a value, which is associated with an element, with a field based on a pattern such as a regular expression pattern may be implemented by a transformer rule.

Another adapter may facilitate mapping values associated with an element to new values. For example, the letter grades A, B, C, D, and F may be mapped respectively to the numerals 4, 3, 2, 1, and 0. In this regard, the adapter may utilize a lookup table of new values that are indexed with the value associated with the element.

Other adapters for converting between time zones, currencies, and other units of measure may be implemented by the transformer rules.

VIII. SECOND TRANSFORMATION LOGIC EMBODIMENT

Figure 15:
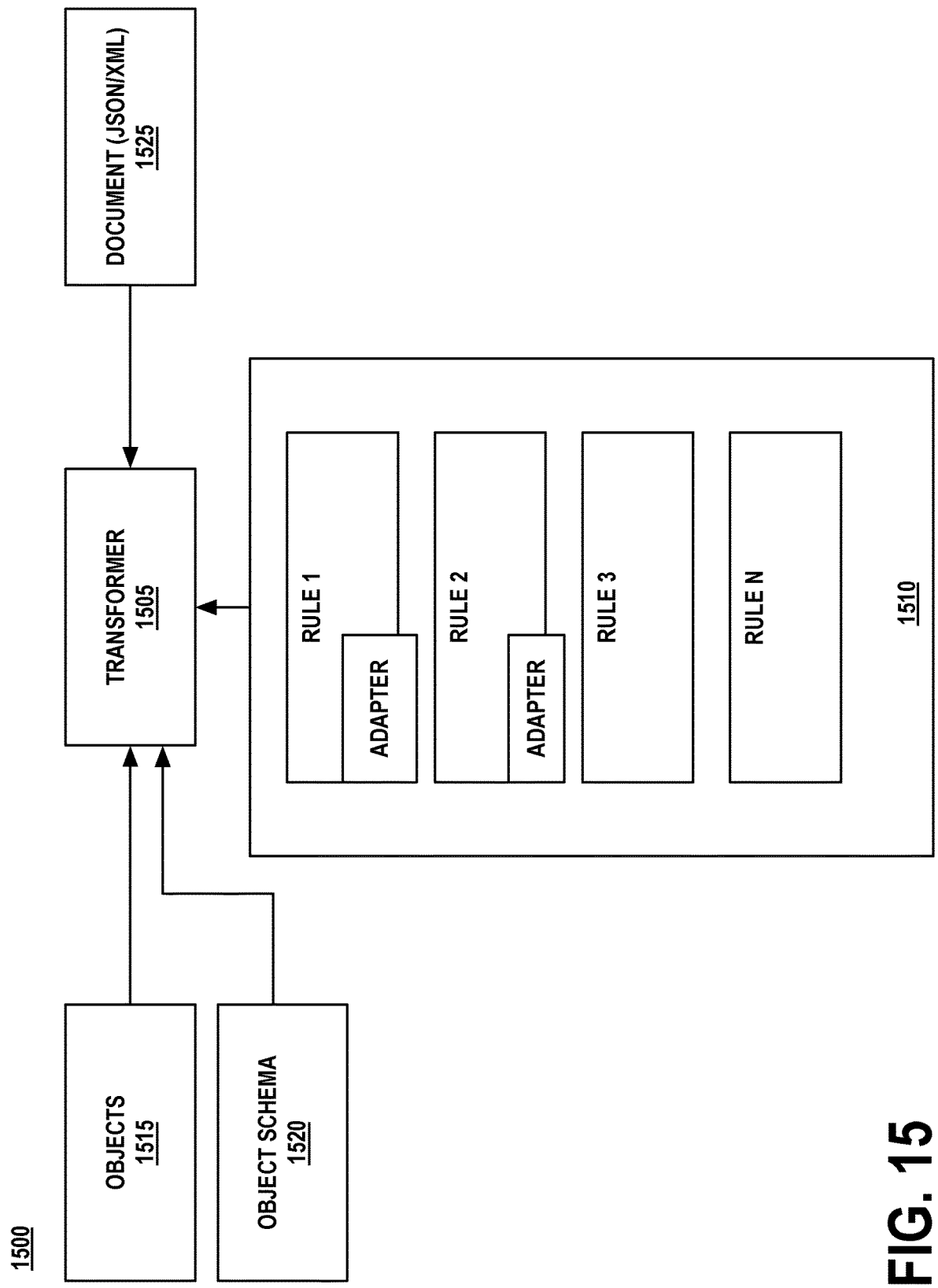
FIG. 15 depicts second logic that facilitates the conversion of data from a first structured data format to a second structured data format, in accordance with example embodiments.

FIG. 15 is an example of a second embodiment of logic 1500 implemented by the processor 102 of the remote network management platform 320 that facilitates the conversion of select data, represented in a first structural format, to a second structural format. The logic 1500 includes a transformer 1505 that is configured to convert select data from stored in an array of objects 1515 to a JSON or XML, document 1525 according to a sequence of transformer rules 1510. In this sense, the transformer 1505 of the second embodiment performs the inverse of the transformer 605 of the first embodiment illustrated in FIG. 6A.

The array of objects 1515 may correspond to an array of JAVA® objects. In this regard, each object of a particular array of objects may define a non-hierarchal (i.e., flat) group of elements specified as key/value pairs. In addition, or alternatively, each object may define a hierarchy. That is each object may include elements that correspond to objects or arrays of other objects. The data to be converted may be stored, for example, in a non-volatile memory in communication with the processor 102.

FIG. 16A represents an exemplary array of JAVA® objects that may be stored in the non-volatile memory. In the figure, the type of each property (i.e., Integer, String) is specified as an aid in understanding the second embodiment. It is understood, however, that the type will not actually be specified in the memory. Instead, the type of each property is specified by an object schema as illustrated in FIG. 16B. For example, the object schema specifies the properties "lastName" and "firstName" to be strings types. The object schema specifies the property "age" to be an integer type. The object schema specifies that the property "car" is a dictionary type.

The transformer 1505 of the second embodiment processes data within the object in much the same way as the transformer 605 of the first embodiment. That is, the transformer 1505 of the second embodiment applies a sequence of transformer rules (See FIG. 16C) and adapters to convert data within the object to a different structural format. In this regard, the transformer rules 1510 control the second transformer embodiment to convert the array of objects 1515 illustrated in FIG. 16A into the JSON document 1705 illustrated in FIG. 17.

IX. APPLICATION PROGRAMMING INTERFACE

Figure 18:
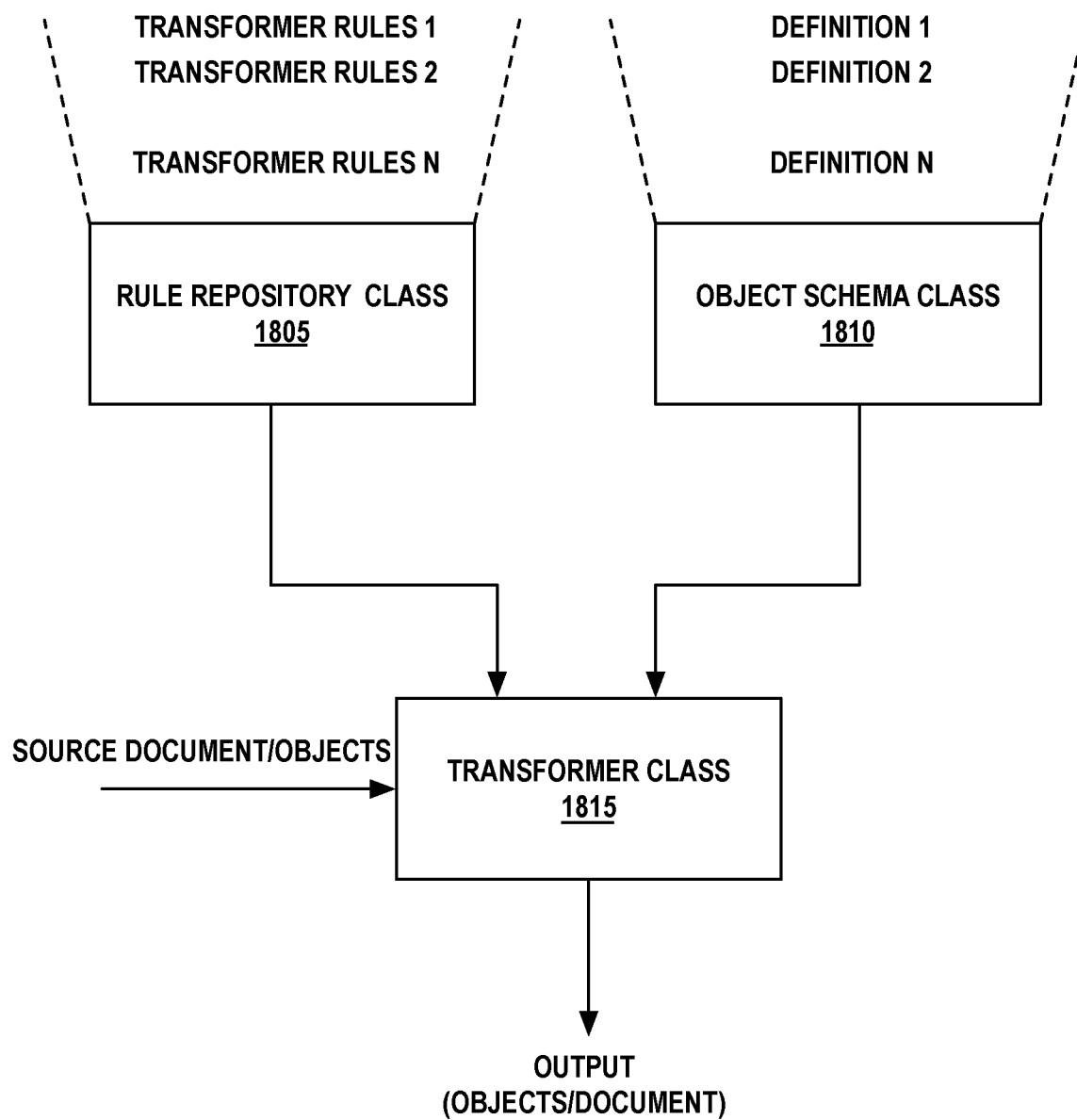
FIG. 18 illustrates a group of object-oriented classes that are part of an application programming interface (API) that may be incorporated into an application programming environment to implement transformer logic, in accordance with example embodiments.

The transformer logic described above may be implemented in a variety of manners. For example, the transformer logic may be implemented in an object-oriented programming environment where objects encapsulate properties and perform procedures, which are sometimes referred to as methods. A procedure corresponds to a computer subroutine that may or may not take parameters and return a result. FIG. 18 illustrates a group of object-oriented classes that are part of an application programming interface (API) that may be incorporated into an application programming environment to implement the transformer logic of the first and second embodiments. The classes include a rule repository class 1805, an object schema class 1810, and a transformer class 1815.

The rule repository class 1805 encapsulates a group of transformer rules. In this regard, the rule repository class 1805 may specify rule definition procedures that facilitate adding transformer rules to an instance of the rule repository class 1805. For example, the rule repository class 1805 may specify rule definition procedures that facilitate specifying the transformer rule commands described above such as EXTRACT, EXTRACTCOMPLEXNODE, ENDCOMPLEXNODE, CONCATENATE, CONCATENATESYMBOL, FORMAT, and MULTIPLY. Other rule definition procedures for performing other commands may be specified.

Each of the rule definition procedures may specify parameters required by the procedure. For example, the parameters may include a path expression parameter, a field parameter, and/or a pattern parameter. Other parameters required by a particular procedure may be specified.

In an implementation, each rule definition procedure may return a copy of the rule repository class instance. In a dot notation environment, the returned instance facilitates cascading together a group of rule definition procedures, which may improve readability of source code. For example, the procedures may be specified as follows:

```
(rule repository instance). EXTRACT(path expression 1, field 1).
    EXTRACT(path expression 2, field 2).
    EXTRACT(path expression 3, field 3)
```

Following this example, if the rule repository instance was stored in the variable ruleRepo, the transformer rules of FIG. 8 could be specified with the following notation:

```
ruleRepo.EXTRACT("$.employees.firstName", "First Name").
    EXTRACT("$.employees.lastName", "Last Name").
    EXTRACT("$.employees.age", "Age").
    EXTRACT("$.employees.car.make", "Car Color").
    EXTRACT("$.employees.car.color", "Car Make").
```

The object schema class 1810 encapsulates a group of type definitions that facilitate specifying the type (e.g., string, integer) of a value. In this regard, the object schema class 1810 may specify one or more definition procedures that facilitate adding type definitions to an instance of an object schema class 1810. For example, the object schema class 1810 may specify an ADD DEFINITION procedure to add a type definition to an instance of an object schema class 1810. The definition procedures may specify parameters required by the definition procedure such as the name of associated with a value and a type to be associated with the value.

In an implementation, each definition procedure returns a copy of the object schema class instance. In a dot notation environment, the returned instance facilitates cascading together a group of definition procedures, which may improve readability of source code.

The transformer class 1815 may be instantiated and configured to process a JSON-formatted document, an XML formatted document, tables in a database, an array of JAVA® objects, or data stored in a different format or configuration in accordance with the embodiments described above. In this regard, the transformer class 1815 may include procedures that facilitate specifying a source document, an instance of the rule repository class 1805, and an instance of the object schema class 1810.

The transformer class 1815 may include a procedure such as TRANSFORM that controls the instance of the transformer class 1815 to apply the transformer rules specified in the instance of the rule repository class 1805 to the source document. The transformer class 1815 may also include procedures for monitoring the state of the instance of the transformer class 1815. For example, the transformer class 1815 may include a procedure such as ROW_PROCESSED that returns a flag indicative of whether a record in a document has been processed and a procedure such as FINISHED PROCESSING that returns a flag indicative of whether the entire document has been processed.

Other procedures may facilitate obtaining converted data associated with a record. For example, the transformer class 1815 may include a procedure such as GET_ROW_DATA that returns data associated with a converted record. The returned data may correspond to a dictionary of key/value pairs. The value may be a scalar value, such as an integer or a string, or the value may be an array of objects.

X. EXAMPLE APPLICATION PROGRAMMING INTERFACE OPERATIONS

Figure 19A:
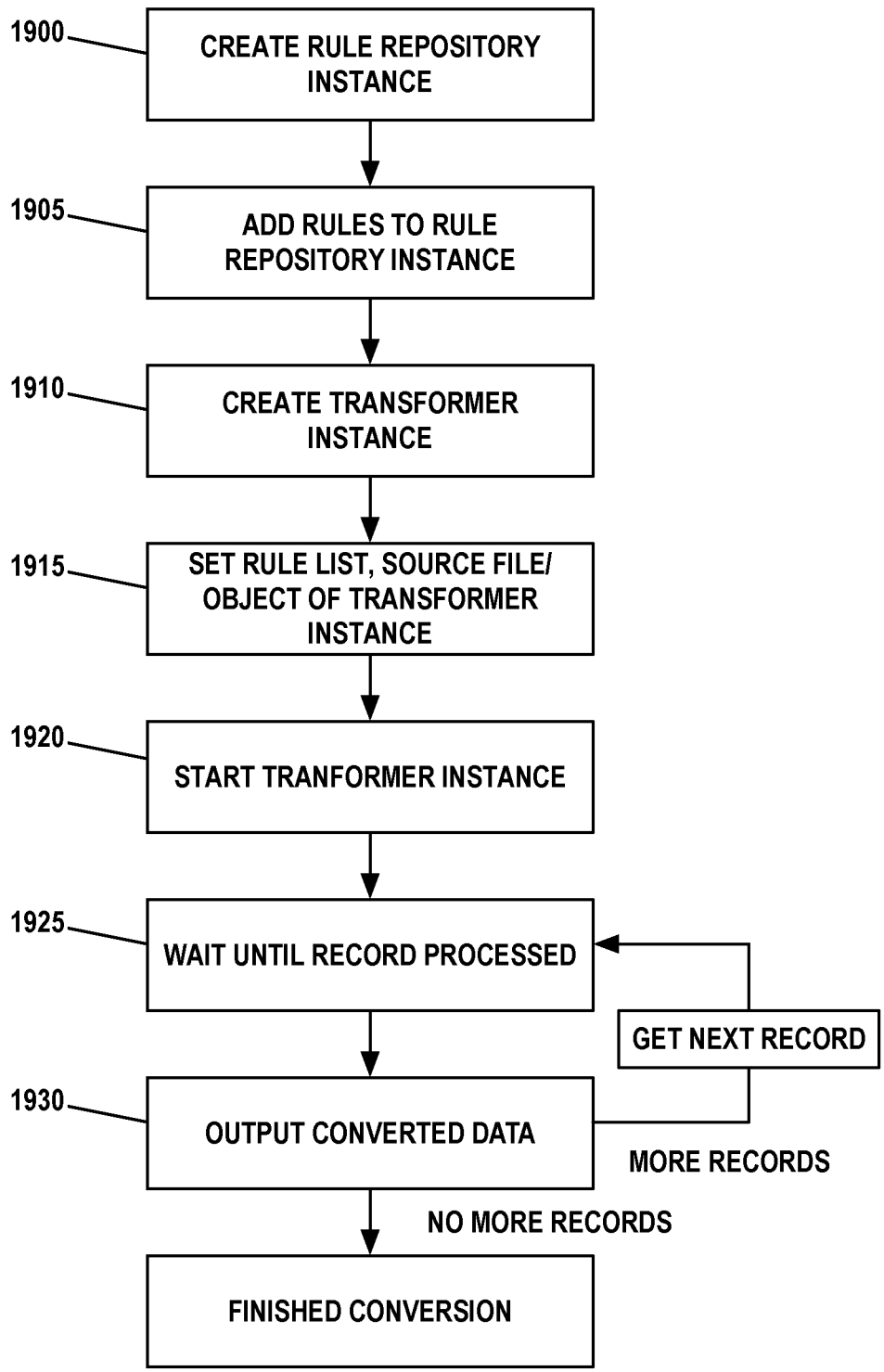
FIG. 19A is a flow chart of operations that may be performed by a processor in executing instruction code associated with the object-oriented classes of FIG. 18, in accordance with example embodiments.
Figure 19B:
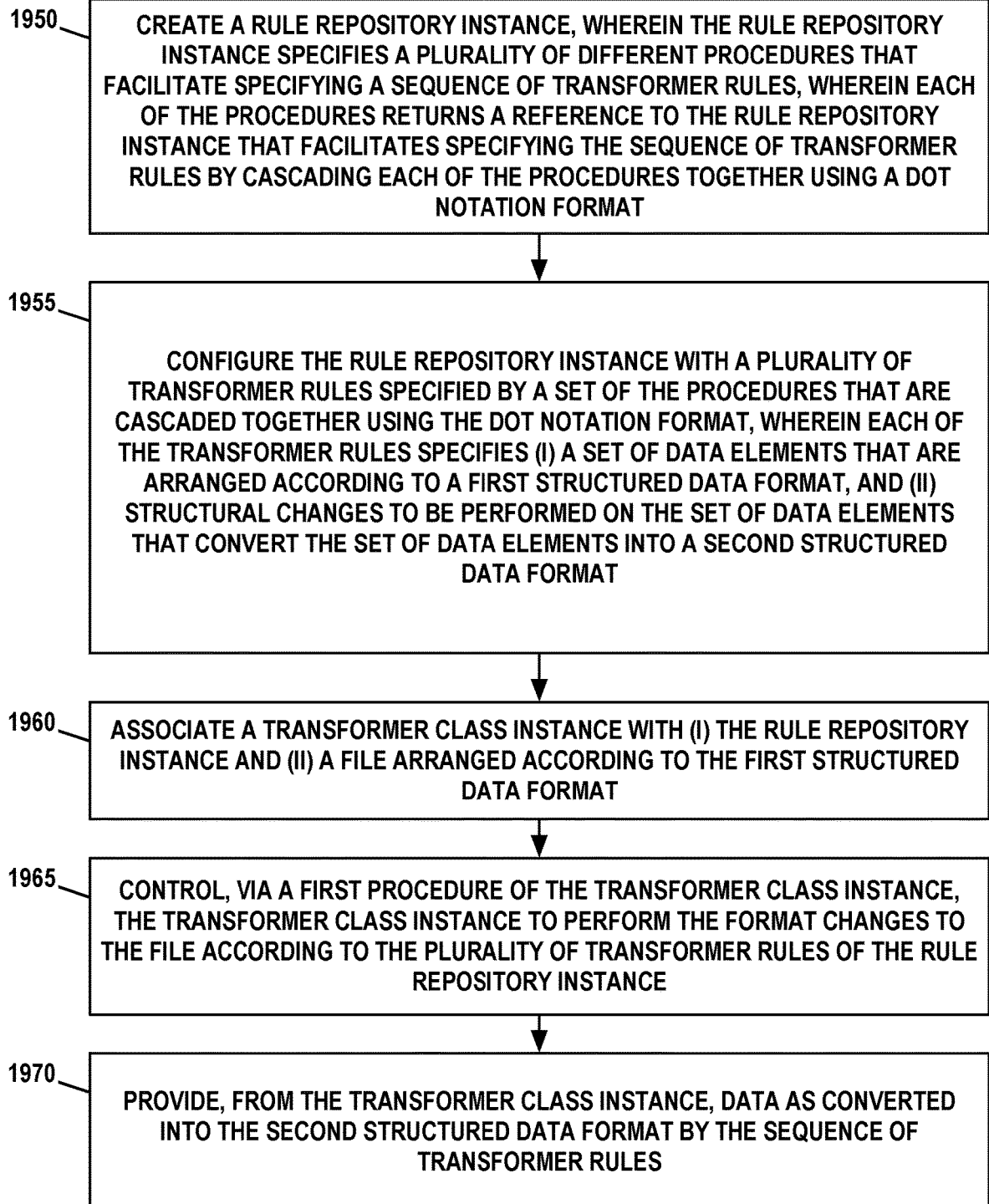
FIG. 19B is a flow chart illustrating a variation of the operations illustrated in FIG. 19A, in accordance with example embodiments.

FIGS. 19A and 19B are exemplary flow charts of operations that may be performed by the processor 102 of the remote network management platform 320 in executing instruction code associated with the API. The operations may be performed by a computing device, such as the computing device 100 illustrated in FIG. 1, and/or a cluster of computing devices, such as the server cluster 200 illustrated in FIG. 2. However, the operations may be performed by other types of devices or device subsystems. For example, the operations may be performed by a portable computer, such as a laptop or a tablet device.

The embodiment of FIGS. 19A and 19B may be simplified by the removal of any one or more of the features shown therein. Further, the embodiment may be combined with features, aspects, and/or implementations of any of the previous figures or otherwise described herein.

At operation 1900, an instance of a rule repository class 1805 may be created. For example, the processor 102 may execute instruction code associated with an application that calls a procedure of the instance of the rule repository class 1805 such as a constructor procedure to instantiate an instance of a rule repository class 1805 in a memory 104 of the remote network management platform 320. The address to the location in memory 104 of the instance may be maintained by the application.

At operation 1905, the processor 102 may execute instruction code associated with an application that calls rule definition procedures of the instance of the rule repository class 1805 to add rules and adapters to the instance of the rule repository class 1805. For example, the procedures called my include EXTRACT, EXTRACTCOMPLEXNODE, ENDCOMPLEXNODE, CONCATENATE, CONCATENATESYMBOL, FORMAT, and MULTIPLY. As noted above, each of the rule definition procedures may specify parameters required by the procedure such as a path expression parameter, a field parameter, a pattern parameter, and/or other required parameters of the rules definition procedure. Upon execution by the processor 102, each rule definition procedure may return a copy of the instance of the rule repository class 1805. In dot notation, this facilitates cascading together a group of rule definition procedures, which may improve readability of source code.

At operation 1910, an instance of a transformer class 1815 may be created. For example, the processor 102 may execute instruction code associated with an application that calls a procedure of the instance of the transformer class 1815, such as a constructor procedure, to instantiate an instance of a transformer class 1815 in a memory 104 of the remote network management platform 320. The address to the location in memory 104 of the instance may be maintained by of the application.

At operation 1915, the processor 102 may execute instruction code associated with an application that calls procedures of the instance of the transformer class 1815 that facilitate specifying a source document, an instance of the rule repository class 1805, and an instance of the object schema class 1810. For example, the instance of the transformer class 1815 may obtain the JSON-formatted document 700 illustrated in FIG. 7. In this regard, the transformer 605 may retrieve the entire JSON-formatted document 700 from a non-volatile or a volatile memory in communication with the transformer 605. Alternatively, the JSON-formatted document 700 may be stored in a system external from the transformer 605 in which case data in the JSON-formatted document 700 may be streamed. In this case, the transformer 605 may obtain blocks of data that collectively correspond to the JSON-formatted document 700.

At operation 1920, the processor 102 may execute instruction code associated with an application that calls a procedure of the instance of the transformer class 1815 such as TRANSORM to start the transformer instance. Once started, the transformer instance may apply the transformer rules specified in the instance of the rule repository class 1805 to the source document. In this regard, the instance of the transformer class 1815 may apply the transformer rules on a record-by-record basis. That is, all the transformer rules may be applied against the first record 705 in the JSON document of FIG. 7 followed by the second record 710.

At operation 1925, the processor 102 may execute instruction code associated with an application that calls a procedure of the instance of the transformer class 1815 such as ROW_PROCESSED to determine whether a record in the source document has been converted.

If a record has been converted, then at operation 1930, the processor 102 may execute instruction code associated with the application that calls a procedure of the instance of the transformer class 1815 such as GET_ROW_DATA to output converted data associated with the converted record. The returned data may correspond to a dictionary of key/value pairs. The value may be a scalar value, such as an integer or a string, or the value may be an array of objects.

The processor 102 may the execute instruction code associated with the application that calls a procedure of the instance of the transformer class 1815 FINISHED PROCESSING to determine whether all the records specified by the path expression have been converted. If more records require conversion, then the operations may continue from operation 1925. Otherwise, conversion is considered to be finished.

FIG. 19B illustrates a more detailed variation of FIG. 19A. Block 1950 may involve creating a rule repository instance, wherein the rule repository instance specifies a plurality of different procedures that facilitate specifying a sequence of transformer rules, wherein the procedures returns a reference to the rule repository instance that facilitates specifying the sequence of transformer rules by cascading each of the procedures together using a dot notation format.

Block 1955 may involve configuring the rule repository instance with a plurality of transformer rules specified by a set of the procedures that are cascaded together using the dot notation format, wherein each of the transformer rules specifies (i) a set of data elements that are arranged according to a first structured data format, and (ii) structural changes to be performed on the set of data elements that convert the set of data elements into a second structured data format.

Block 1960 may involve associating a transformer class instance with (i) the rule repository instance and (ii) a file arranged according to the first structured data format.

Block 1965 may involve controlling, via a first procedure of the transformer class instance, the transformer class instance to perform the structural changes to the file according to the plurality of transformer rules of the rule repository instance.

Block 1970 may involve providing, from the transformer class instance, data as converted into the second structured data format by the sequence of transformer rules.

In some embodiments, a second procedure takes a path parameter and a field parameter. In this embodiment, the processor stores a key/value pair data structure in the memory. The key of the key/value pair data structure corresponds to the field parameter. The value of the key/value pair data structure corresponds to a further value in the first structured data file specified by the path parameter.

In some embodiments, the path parameter and the field parameter are text strings.

In some embodiments, the path parameter corresponds to a JSON path or an XML path that specifies the set of data elements to be converted.

In some embodiments, a third procedure that corresponds to an adapter for performing an operation is cascaded to the second procedure. The second procedure takes a further field parameter that corresponds to the field parameter of the second procedure. In this embodiment, the processor modifies the value associated with the key/value pair data structure stored in the memory according to an operation associated with the third procedure.

In some embodiments, the operation associated with the third procedure corresponds to one of: a math operation that modifies the value of the key/value pair data structure according to a computation, a text operation that modifies the value of the key/value pair data structure by trimming a portion of the value, or a concatenation operation that modifies the value of the key/value pair data structure by adding another value to the value.

In some embodiments, each of the procedures returns a reference to the rule repository instance.

In some embodiments, the first structured data format corresponds to one of: JSON, XML, a JAVA® object, or a database table, and wherein the second structured data format corresponds to one of: JSON, XML, a JAVA® object, or a database table.

XI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a processor; and
memory in communication with the processor, storing instruction code executable by the processor to cause the processor to perform operations that include:
obtaining a sequence of transformer rules, wherein each of the transformer rules specifies (i) a set of data elements that are arranged according to a first structured data format, (ii) structural changes to be performed on the set of data elements that convert the set of data elements into a second structured data format, and wherein the sequence of transformer rules comprises:
a first transformer rule that applies an adapter of a plurality of adapters, wherein the adapter modifies values of the set of data elements; and
a second transformer rule that does not apply any adapter of the plurality of adapters;
receiving a first block of data from a file arranged according to the first structured data format;
executing the sequence of transformer rules in order to perform the structural changes to the first block of data, wherein executing the first transformer rule includes applying the adapter to modify the values in the first block of data specified by the first transformer rule;
providing, for display, storage, or function processing, the first block of data as converted into the second structured data format by the sequence of transformer rules;
receiving, after processing the first block of data, a second block of data from the file arranged according to the first structured data format;
executing the sequence of transformer rules in order to perform the structural changes to the second block of data, wherein executing the first transformer rule includes applying the adapter to modify the values in the second block of data specified by the first transformer rule; and
providing, for display, storage, or function processing, the second block of data as converted into the second structured data format by the sequence of transformer rules.

2. The system according to claim 1, wherein the first structured data format corresponds to one of: JavaScript Object Notation (JSON), Extensible Markup Language (XML), a JAVA object, or a database table, and wherein the second structured data format corresponds to one of: JSON, XML, a JAVA object, or a database table.

3. The system according to claim 1, wherein the set of data elements corresponds to one or more of: scalar values, records, objects, or arrays of objects or scalars.

4. The system according to claim 1, wherein each of the transformer rules is associated with a Java object, a JavaScript Object Notation (JSON) or Extensible Markup Language (XML) path that specifies the set of data elements to be converted.

5. The system according to claim 1, wherein the first transformer rule specifies a field, wherein the second transformer rule specifies a change in format to be applied to a respective value, of the values of the set of data elements, associated with the field.

6. The system according to claim 1, wherein the set of data elements includes a plurality of records, wherein each of the plurality of records specifies a respective value of the values, comprising a key/value pair, wherein executing the first transformer rule causes the processor to perform operations that include:
associating the respective value of each record associated with a particular key to a column in a database table.

7. The system according to claim 1, wherein the set of data elements includes a plurality of records, wherein each of the plurality of records includes a hierarchy of objects, wherein executing the first transformer rule causes the processor to perform operations that include:
recursively associating key/value pairs at each level of the hierarchy of objects to a database table associated with the level.

8. The system according to claim 1, wherein executing the first transformer rule causes the processor to perform operations that include:
generating, based on a type of the adapter, one or more new values from one or more of the values of the set of data elements.

9. The system according to claim 8, wherein a new value of the one or more new values corresponds to: a result of a mathematical computation of the one or more of the values, outputting a textual portion associated with the one or more of the values that is specified by a pattern, a concatenation of the one or more of the values, or a lookup table value indexed according to one of the one or more of the values, or any combination thereof.

10. A computer-implemented method comprising:
obtaining a sequence of transformer rules, wherein each of the transformer rules specifies (i) a set of data elements that are arranged according to a first structured data format, (ii) structural changes to be performed on the set of data elements that convert the set of data elements into a second structured data format, and wherein the sequence of transformer rules comprises:
a first transformer rule that applies an adapter of a plurality of adapters, wherein the adapter modifies values of the set of data elements; and
a second transformer rule that does not apply any adapter of the plurality of adapters;
receiving a first block of data from a file arranged according to the first structured data format;
executing the sequence of transformer rules in order to perform the structural changes to the first block of data, wherein executing the first transformer rule includes applying the adapter to modify the values in the first block of data specified by the first transformer rule;
providing, for display, storage, or function processing, the first block of data as converted into the second structured data format by the sequence of transformer rules
receiving, after processing the first block of data, a second block of data from the file arranged according to the first structured data format;
executing the sequence of transformer rules in order to perform the structural changes to the second block of data, wherein executing the first transformer rule includes applying the adapter to modify the values in the second block of data specified by the first transformer rule; and
providing, for display, storage, or function processing, the second block of data as converted into the second structured data format by the sequence of transformer rules.

11. The computer-implemented method according to claim 10, wherein the first structured data format corresponds to one of: JavaScript Object Notation (JSON), Extensible Markup Language (XML), a JAVA object, or a database table, and wherein the second structured data format corresponds to one of: JSON, XML, a JAVA object, or a database table.

12. The computer-implemented method according to claim 10, wherein the set of data elements corresponds to one or more of: scalar values, records, objects, or arrays of objects or scalars.

13. The computer-implemented method according to claim 10, wherein each of the transformer rules is associated with a Java object, a JavaScript Object Notation (JSON) or Extensible Markup Language (XML) path that specifies the set of data elements to be converted.

14. The computer-implemented method according to claim 10, wherein the first transformer rule specifies a field, wherein the second transformer rule specifies a change in format to be applied to a respective value, of the values of the set of data elements, associated with the field.

15. The computer-implemented method according to claim 10, wherein the set of data elements includes a plurality of records, wherein each of the plurality of records specifies a respective value of the values, comprising a key/value pair, wherein the method comprises:
    associating the respective value of each record associated with a particular key to a column in a database table.

16. The computer-implemented method according to claim 10, wherein the set of data elements includes a plurality of records, wherein each of the plurality of records includes a hierarchy of objects, wherein the method comprises:
    recursively associating key/value pairs at each level of the hierarchy of objects to a database table associated with the level.

17. The computer-implemented method according to claim 10, wherein the method comprises:
    generating, based on a type of the adapter, one or more new values from one or more of the values of the set of data elements.

18. The computer-implemented method according to claim 17, wherein a new value of the one or more new values corresponds to: a result of a mathematical computation of the one or more of the values, outputting a textual portion associated with the one or more of the values that is specified by a pattern, a concatenation of the one or more values, or a lookup table value indexed according to one of the one or more of the values, or any combination thereof.

19. An article of manufacture including a non-transitory computer-readable medium, having stored thereon program instructions that, upon execution by a computing system, cause the computing system to perform operations comprising:
    obtaining a sequence of transformer rules, wherein each of the transformer rules specifies (i) a set of data elements that are arranged according to a first structured data format, (ii) structural changes to be performed on the set of data elements that convert the set of data elements into a second structured data format, and wherein the sequence of transformer rules comprises:
        a first transformer rule that applies an adapter of a plurality of adapters, wherein the adapter modifies values of the set of data elements; and
        a second transformer rule that does not apply any adapter of the plurality of adapters;
    receiving a first block of data from a file arranged according to the first structured data format;
    executing the sequence of transformer rules in order to perform the structural changes to the first block of data, wherein executing the first transformer rule includes applying the adapter to modify the values in the first block of data specified by the first transformer rule;
    providing, for display, storage, or function processing, the first block of data as converted into the second structured data format by the sequence of transformer rules
    receiving, after processing the first block of data, a second block of data from the file arranged according to the first structured data format;
    executing the sequence of transformer rules in order to perform the structural changes to the second block of data, wherein executing the first transformer rule includes applying the adapter to modify the values in the second block of data specified by the first transformer rule; and
    providing, for display, storage, or function processing, the second block of data as converted into the second structured data format by the sequence of transformer rules.

20. The article of manufacture according to claim 19, wherein the set of data elements includes a plurality of records, wherein each of the plurality of records includes a hierarchy of objects, wherein the operations comprise:
    recursively associating key/value pairs at each level of the hierarchy of objects to a database table associated with the level.

* * * * *

UNITED STATES PATENT AND TRADEMARK OFFICE
CERTIFICATE OF CORRECTION

PATENT NO. : 11,429,631 B2  
APPLICATION NO. : 16/675913  
DATED : August 30, 2022  
INVENTOR(S) : Khosrow Jian Motamedi, Fernando Ros and Douglas Andrew Bell Page 1 of 1

It is certified that error appears in the above-identified patent and that said Letters Patent is hereby corrected as shown below:

On the Title Page

Item (72) listing of the inventors, please change the third inventor's city, state and country from "South Dudley, AU" to --San Diego, CA--.

Signed and Sealed this
Twenty-seventh Day of September, 2022

Katherine Kelly Vidal
*Director of the United States Patent and Trademark Office*